United States Patent [19]
Sanford

[11] Patent Number: 5,551,797
[45] Date of Patent: Sep. 3, 1996

[54] UNDERGROUND DRAINAGE SUMP SYSTEM AND METHOD OF RETROFITTING FOR PROTECTING A FLOOR SLAB

[76] Inventor: Paul C. Sanford, P.O. Box 1071, Elbow Lake, Minn. 56531

[21] Appl. No.: 390,242

[22] Filed: Feb. 17, 1995

[51] Int. Cl.$^6$ .............................. E02D 31/02; F24F 7/06; F24F 11/00
[52] U.S. Cl. .......................... 405/36; 52/169.5; 52/302.3; 454/909; 405/51; 405/229
[58] Field of Search .................................. 405/36, 50, 51, 405/229, 284; 52/169.5, 302.1, 302.3, 302.7, 741.3; 345/909

[56] References Cited

U.S. PATENT DOCUMENTS

| | | | |
|---|---|---|---|
| 2,717,513 | 9/1955 | Smart | 52/302.3 X |
| 4,298,294 | 11/1981 | Zimmerman | 405/37 |
| 4,486,986 | 12/1984 | Cosenza | 52/169.5 |
| 4,523,875 | 6/1985 | DiFiore | 405/50 |
| 4,620,398 | 11/1986 | Wallin | 454/909 X |
| 4,858,521 | 8/1989 | Heh | 454/344 |
| 4,890,425 | 1/1990 | Mamula | 52/169.5 X |
| 4,905,579 | 3/1990 | Dame | 454/238 |
| 4,938,124 | 7/1990 | Garza | 454/343 |
| 4,949,626 | 8/1990 | Townsend et al. | 454/341 |
| 4,988,235 | 1/1991 | Hurley | 405/36 X |
| 5,080,004 | 1/1992 | Francis et al. | 454/341 |
| 5,101,712 | 4/1992 | Dean, Jr. | 454/341 |
| 5,158,501 | 10/1992 | Proskiw | 454/341 |

OTHER PUBLICATIONS

"Radon Reduction Techniques For Detached Houses–Technical Guidance", EPA/625/5–86/019 Jun. 1986 pp. 13–39.

*Primary Examiner*—David J. Bagnell
*Attorney, Agent, or Firm*—John R. Flanagan

[57] ABSTRACT

A method of retrofitting an underground water drainage sump system to below a floor slab for protecting the floor slab includes the steps of forming a sump hole below a floor slab of a building, drilling into and removing soil from below the floor slab so as to form a plurality of lateral passageways extending from a central location relative to an outer perimeter of the floor slab, extending the lateral passageways outwardly at two different levels and lengths and alternating therebetween to and beyond a footer at the outer perimeter of the floor slab, inserting a plurality of perforated collection pipes into the lateral passageways, placing a perforated drum into the sump hole such that inner ends of the perforated collection pipes are adjacent to the perforated drum, filling the sump hole around at least the lower portion of the perforated drum with drainage stones, placing a sump pump into the perforated drum, connecting the sump pump to a discharge pipe for transporting the drainage water from the perforated drum into a sewer system of the building or otherwise to the outside of the building away from the floor slab, and providing a cover for removably covering the sump hole.

40 Claims, 2 Drawing Sheets

UNDERGROUND DRAINAGE SUMP SYSTEM AND METHOD OF RETROFITTING FOR PROTECTING A FLOOR SLAB

BACKGROUND OF THE INVENTION

1. Field of the Invention

The present invention generally relates to water drainage systems and, more particularly, is concerned with an underground water drainage sump system and method of retrofitting the system for protecting a floor slab of a building. The present invention also is applicable to sub-slab depressurization for removal of polluting gases, such as radon, from a building.

2. Description of the Prior Art

The accumulation of water below the surface of the ground under a floor slab of a basement and around the foundation of a building can be a substantial problem in many areas of the country, particularly where the water table is high or rainfall is plentiful. For this reason, various approaches to finding a solution to this problem have been attempted in the past.

One widely-practiced approach has been to install a sump pump drainage system during the construction of the building. The process of installation of such system generally involves forming a sump hole in the ground before the floor slab is laid, placing a liner in the sump hole and then laying a porous water collection pipe along the foundation having its opposite ends extending into the sump hole through the liner for drainage of water therein from about the foundation. The floor slab is then poured over the pipe. Thereafter, a sump pump is placed in the sump hole for pumping the water collected therein into the sewer system where allowed or otherwise outside of the building away from the floor slab. Another approach taken during construction of the building, as proposed in U.S. Pat. No. 4,486,986 to Cosenza, involves providing for drainage of underground water from outside the building foundation through drain holes formed in the basement wall above the footing to a collection pipe laid around the inside of the foundation footing below the floor slab.

The solution to the problem of underground water accumulation is, of course, more difficult in the case of a building constructed without adequate provision of means for removing the underground water before it causes the foundation or basement floor to crack, buckle or flood. Various approaches to retrofitting the exterior of the foundation or interior of the basement floor of the building with some means for removing the underground water have been proposed in the prior art.

One approach to retrofitting a drainage means at the exterior of the building, as disclosed in U.S. Pat. No. 4,298,294 to Zimmerman, involves providing an exterior wet well at a location spaced from the building and extending to a depth below the lowest level of the foundation and placing a submersible pump therein which is operated to remove the water collected in the bottom of the well. Another approach to retrofitting a drainage means at the exterior of the building, as disclosed in U.S. Pat. No. 4,523,855 to DiFiore, involves providing an auxiliary drainage system in a trench which extends about the exterior of the foundation of the building. These exterior approaches have likely been found to be largely ineffective as solutions to the aforementioned problem in view that they do not appear to have been widely adopted because they are expensive and disruptive to the exterior landscaping.

One approach to retrofitting a drainage means at the interior of the building involves cutting a trench around the perimeter of the basement floor slab at its juncture with the foundation so that the underground water can then be collected and pumped from the building. However, this approach requires substantial alteration of the existing floor slab which may have unintended damaging consequences for the building and is expensive and disruptive to finished basements.

Various other approaches have proposed in the prior art to solving another problem involving the seepage of various gaseous pollutants, such as radon gas, from the underground soil into an existing building. Some representative examples of these approaches are disclosed in U.S. Pat. No. 4,858,521 to Heh, U.S. Pat. No. 4,905,579 to Dame, U.S. Pat. No. 4,938,124 to Garza, U.S. Pat. No. 4,949,626 to Townsend et al., U.S. Pat. No. 5,080,004 to Francis et al., U.S. Pat. No. 5,101,712 to Dean, Jr., U.S. Pat. No. 5,158,501 to Proskiw and in a U.S. Environmental Protection Agency publication entitled "Radon Reduction Techniques For Detached Houses-Technical Guidance" identified as EPA/625/5-86/019 and dated June 1986.

The approach disclosed in U.S. Pat. No. 4,858,521 to Heh involves retrofitting an exhaust system in the ground below and outside the foundation. In the approach of the Heh patent, a hydraulic press/impactor is utilized to drive sections of threaded and perforated pipe under a building footer and floor slab. A sufficient length of pipe is made by threading and bonding numerous such pipes together. Once the pipes are in place, each is then interconnected at one end to a plurality of above ground vent holes and at an opposite end to an above ground fan opposite the holes. When in operation, the fan creates a vacuum in the pipes causing the radon gas to be drawn out from the soil and into the pipes through the pipe perforations and exhausted to the outside air where it dissipates. While such retrofitted system may be effective for reducing the level of radon gas from soil in contact with points of entry into a building, it does not appear to be directly applicable to the problem of water accumulation below the surface of the ground under or around a foundation or basement.

Consequently, a need still remains for a suitable retrofitted underground water drainage system for protecting the floor slab of an existing building which does not adversely affect the structural integrity of the building floor slab and foundation and is minimally disruptive to the existing building.

SUMMARY OF THE INVENTION

The present invention provides an underground water drainage sump system and method of retrofitting the system being designed to satisfy the aforementioned needs. The principal advantage of the retrofitted underground water drainage sump system of the present invention is that it provides substantially the same effective protection of the floor slab and foundation of an existing building as that provided by the installation of a sump pump drainage system during construction of a new building. Furthermore, the present invention provides such comparable protection by only requiring that substantially the same alteration be made to the floor slab in the method of retrofitting the underground water drainage sump system as is made in the case of the installation of a sump pump drainage system in new construction. This alteration is that only one hole has to be made through the building floor slab and dug in the ground below it.

Accordingly, the present invention is directed to a method of retrofitting an underground water drainage sump system to a floor slab for protecting the floor slab. The retrofitting method comprises the steps of: (a) forming a sump hole through and below the floor slab; (b) forming a plurality of lateral passageways below and extending outwardly to the vicinity of an outer perimeter of the floor slab; (c) inserting a plurality of perforated hollow collection pipes into the lateral passageways and manifolding the pipes into the sump hole; and (d) placing a sump pump into the sump hole for pumping drainage water from the sump hole.

More particularly, the sump hole is formed at a central location relative to the outer perimeter of the floor slab and the lateral passageways are formed to extend radially outwardly, like the spokes of a wheel, from the centrally-located sump hole to the perimeter of the floor slab. In the preferred embodiment of the system, the passageways extend outwardly at two different levels and lengths relative to a footer extending about and directly below the outer perimeter of the floor slab. A first group of the lateral passageways extend outwardly at a level in the soil beneath the floor slab not lower than the level of the footer to points of termination located at an interior side to the footer. A second group of the lateral passageways extend outwardly at a level in the soil beneath the floor slab lower than the level of the footer to points of termination located past an exterior side of the footer to draw water off the outside of the foundation wall and footer. The lateral passageways in the first and second groups thereof preferably alternate between the two different levels and lengths.

The retrofitting method further comprises the steps of placing a perforated drum into the sump hole and a quantity of drainage stones into the sump hole about the exterior of the drum. The drum serves as a reservoir for the collection of the water drainage from the pipes which can flow into the drum through its perforations. The stones at least partially fill the space around the exterior of the drum and the wall of the sump hole. The sump pump rests upon the bottom of the drum within the sump hole. A discharge pipe is connected at one end to and extends upwardly from the top of the sump pump through the drum and is connected at the opposite end to a suitable discharge site. Also, a cover is provided for covering the upper end of the sump hole.

The present invention also is directed to the underground water drainage sump system which is the end product of and is constructed by the above-defined steps of the retrofitting method.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
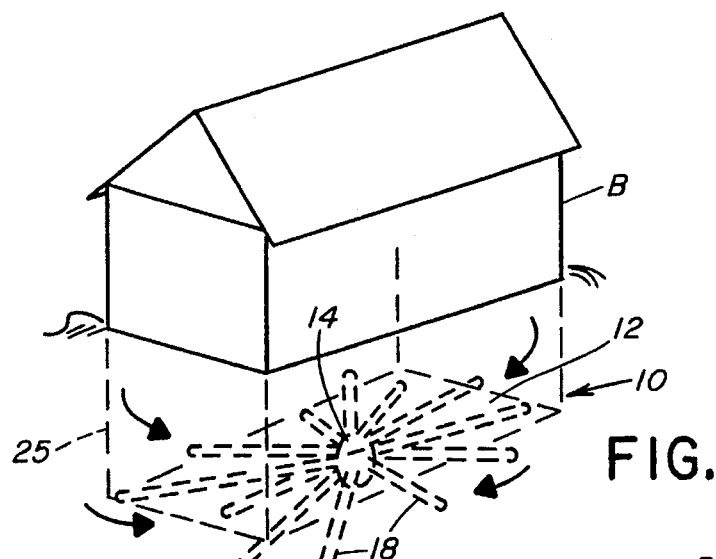
FIG. 1 is a schematic perspective view of a building showing the location of installation of the underground water drainage sump system of the present invention.
Figure 2:
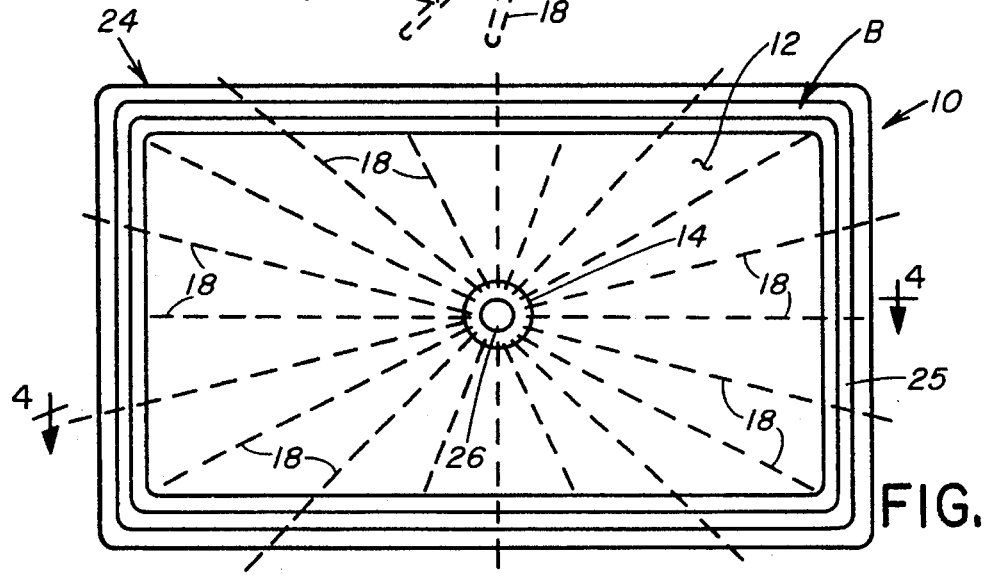
FIG. 2 is a top schematic plan view of a basement floor slab of the building showing the configuration of the installed system.
Figure 8:
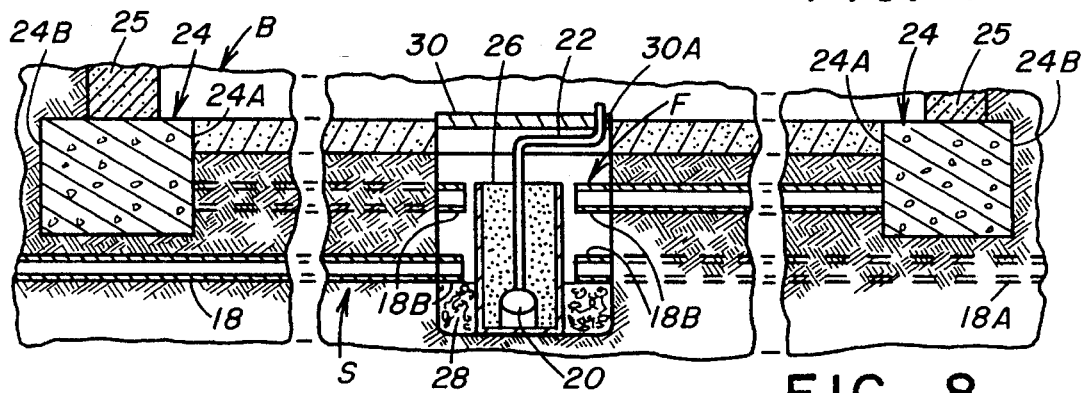
FIG. 8 is an enlarged vertical sectional view of the floor slab after installation of the sump pump and cover of the system.

Referring to the drawings and particularly to FIGS. 1 to 2 and 8, there is illustrated an underground water drainage sump system, generally designated 10, of the present invention retrofitted to below a floor slab 12 of a building B. The system 10 effectively provides for protection of the floor slab 12 while, at the same time, not requiring any significant alteration thereto which might be detrimental to its structural integrity.

The retrofitted system 10 basically includes a sump hole 14, generally cylindrical in shape, formed through the floor slab 12 and extending into the underground soil below the floor slab 12, a plurality of elongated lateral passageways 16 formed in the underground soil below the floor slab 12 so as to extend outwardly from the sump hole 14, along and below the floor slab 12 to the vicinity of the outer perimeter 12A of the floor slab 12, a plurality of perforated hollow collection pipes 18 disposed in the lateral passageways 16 and providing draining of water from the underground below the floor slab 12 to the sump hole 14, and a sump pump 20 disposed in the sump hole 14 for pumping away water drained into the sump hole 14 from the collection pipes 18. Preferably, although not necessarily, the sump hole 14 is formed at a generally central location under the floor slab 12 and relative to the outer perimeter 12A of the floor slab 12. As a result, the lateral passageways 16 and the collection pipes 18 therein radiate or extend radially outwardly from and about the centrally-located sump hole 14. The outer ends 18A of the collection pipes 18 are disposed in the vicinity of the outer perimeter 12A of the floor slab 12. Also, the sump pump 20 is typically connected to a discharge pipe 22 which transports and routes the drainage water pumped by the sump pump 20 away from the sump hole 14 and to a discharge site, such as the sewer system of the building B, if allowed, or otherwise to one located outside of the building B and away from the floor slab 12.

Preferably, although not necessarily, the lateral passageways 16 and thus the collection pipes 18 therein extend outwardly at two different levels below the floor slab 12 and at two different lengths relative to the outer perimeter 12A of the floor slab 12. More particularly, the lateral passageways 16 and collection pipes 18 are provided in first and second groups thereof. In the first group F, the lateral passageways 16 and thus the collection pipes 18 extend along a first level which is not lower than (or, in other words, is above) the level of the bottom of a footer 24 extending around the outer perimeter 12A of the floor slab 12 and supporting the vertical foundation wall 25. The lateral passageways 16 and collection pipes 18 of this first group extend to termination points located at an interior side 24A of the footer 24 which is proximate to the outer perimeter 12A of the floor slab 12. In the second group S, the lateral passageways 16 and thus the collection pipes 18 extend along a second level which is lower than the first level and is lower than the level of the bottom of the footer 24 to termination points located past an exterior side 24B of the footer 24. Preferably, although again not necessarily, the lateral passageways 16 and collection pipes 18 of the first and second groups F, S are arranged so as to alternate with one another between two different levels and lengths.

The retrofitted system 10 also, preferably, includes a generally cylindrical perforated plastic drum 26 disposed in the sump hole 14, and a quantity of drainage stones 28, also known as pea rock, disposed in the annular space between sidewall 14A of the sump hole 14 and the exterior of the drum 26. The inner ends 18B of the perforated collection pipes 18 preferably extend into the sump hole 14 and are disposed adjacent to the exterior of the perforated drum 26. The quantity of drainage stones 28 at least partially fills the sump hole 14 extending around the exterior of at least a lower portion of the perforated drum 26. Further, the retrofitted system 10 includes a cover 30 removably disposed over an upper end 14B of the sump hole 14 to cover the upper end of the sump hole.

Figure 3:
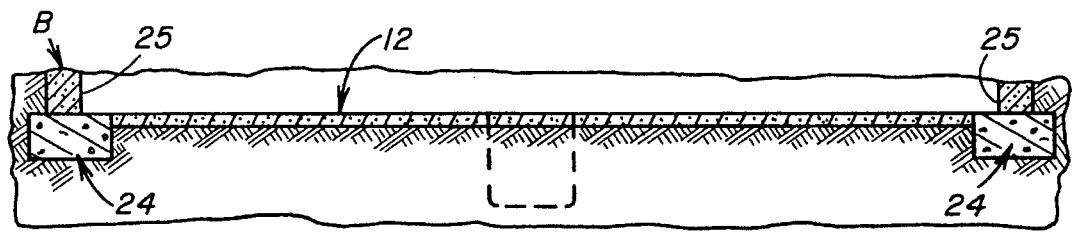
FIG. 3 is a vertical sectional view of the floor slab before installation of the system with an outline showing the location of the sump hole.
Figure 4:
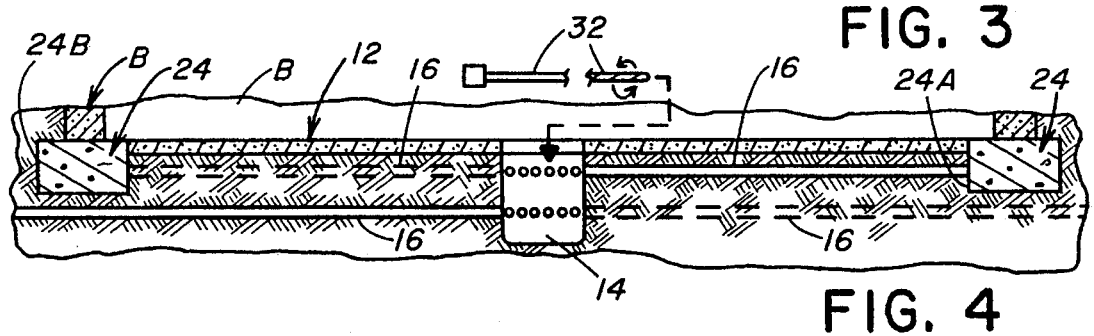
FIG. 4 is a vertical sectional view of the floor slab, taken along line 4—4 of FIG. 2, showing the sump hole and lateral passageways of the system having been formed.
Figure 5:
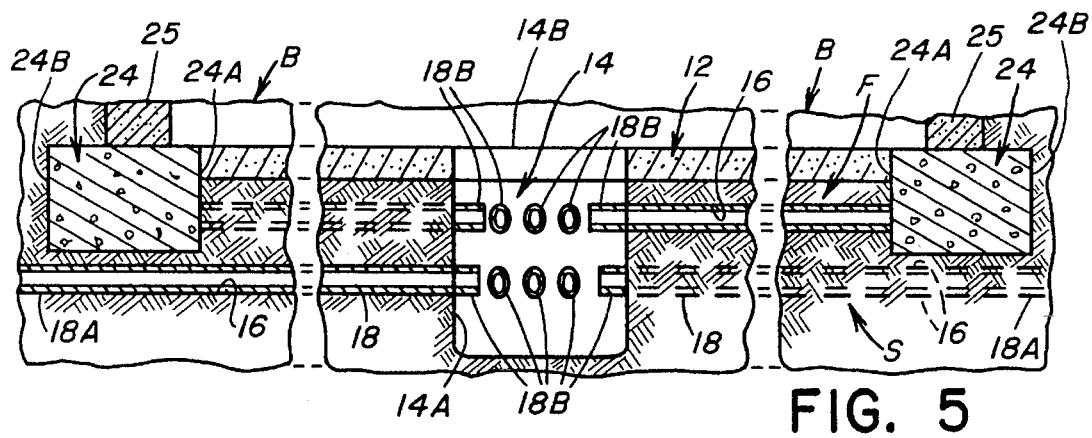
FIG. 5 is an enlarged vertical sectional view of the floor slab after the collection pipes (with their diameters exaggerated) of the system have been installed in the lateral passageways.

Referring now to FIGS. 3 to 5, there is illustrated the initial steps in the method of retrofitting the system 10 below the floor slab 12. FIG. 3 shows the desired general location where the sump hole 14 will be formed. The sump hole 14 is generally cylindrical in shape and is usually dug at a center location relative to the perimeter 12A of the floor slab 12. By way of example only, the sump hole 14 can be made with a forty-two inch diameter through the slab 12 and dug to a depth of from forth-two to forty-eight inches so that it is deep enough to adequately collect water in underground soil well below the floor slab 12. The floor slab 12 which is typically made of concrete is penetrated by use of any suitable conventional drilling or cutting tool.

As seen in FIGS. 4 and 5, the passageways 16 of generally cylindrical cross-sectional shape are formed below the slab 12 in any suitable manner, such as by drilling laterally from the sump hole 14 into the underground soil using a suitable conventional drilling tool 32. The drilling tool 32 causes displacement of soil into the sump hole 14 that is removed to form the passageways 16. Once the displaced soil has fallen into the sump hole 14, it can then be readily removed from the sump hole 14. As many as fifteen to twenty or more of the lateral passageways 16 are typically formed and they can have lengths of up to as much as forty feet depending upon the location of the sump hole 14. They also can extend four to five feet past the exterior side 24B of the footer 24.

As seen in FIGS. 4–8 and described above, the lateral passageways 16 and the elongated porous collection pipes 18 which are inserted therein through the sump hole 14 are preferably provided in upper and lower, or first and second, groups F, S which extend outwardly at least at two different levels and have at least two different lengths relative to the footer 24. Other levels and lengths are also possible. As best seen in FIG. 2, the passageways 16 and pipes 18 of the respective groups preferably are alternated with one another between the two different levels and lengths.

The collection pipes 18 which are inserted through the sump hole 14 and into the lateral passageways 16 are generally cylindrical in shape with, as an example, a three-quarters of an inch diameter and have a plurality of perforations spaced along their lengths to allow water to enter their hollow interiors where it is then transported by gravity to the sump hole 14. To enable insertion of the pipes 18, they are either provided in short sections which can be connected end-to-end or are sufficiently flexible to be guided into the lateral passageways 16 through the sump hole 14.

Figure 6:
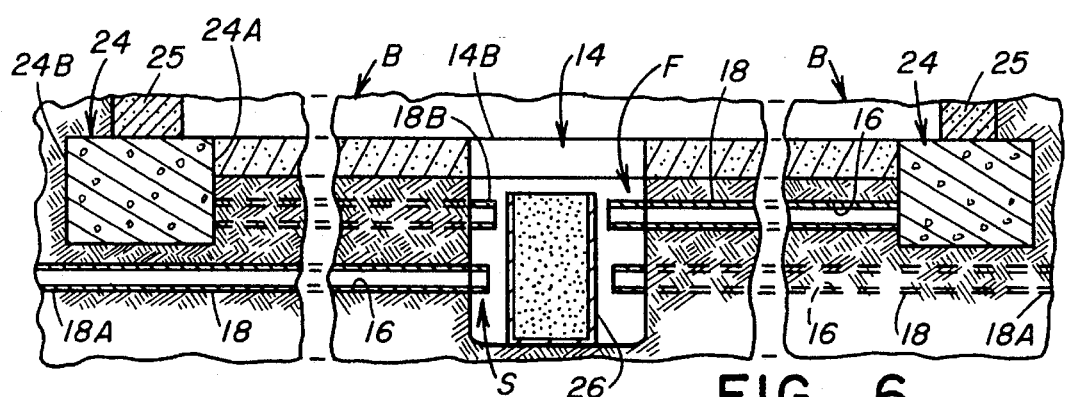
FIG. 6 is an enlarged vertical sectional view of the floor slab after installation of the perforated drum of the system.
Figure 7:
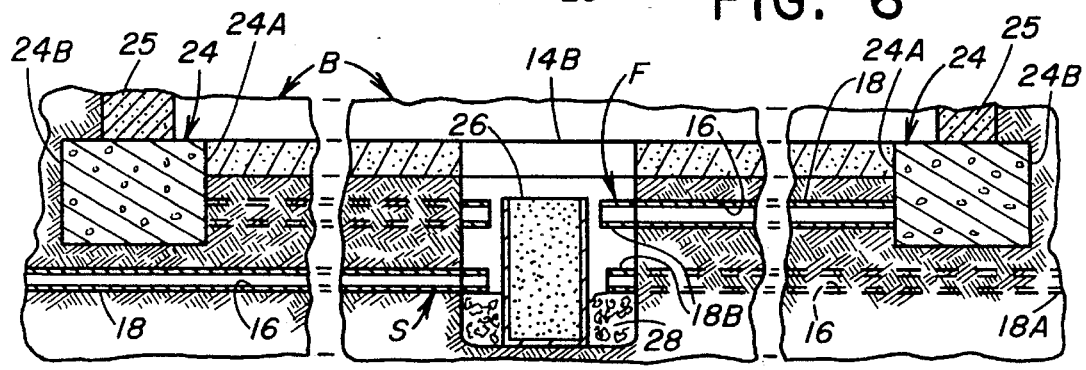
FIG. 7 is an enlarged vertical sectional view of the floor slab after the space between the drum and sump hole has been partially filled with drainage stones of the system.

Referring now to FIGS. 6 to 8, there is illustrated the final steps in the method of retrofitting the system 10. After the collection pipes 18 are inserted into the passageways 16, the perforated drum 26 and then drainage stones 28 are placed into the sump hole 14, as shown in FIGS. 6 and 7. The drum 26 is generally cylindrical in shape and serves as a reservoir for the collection of the water drainage from discharged from the inner ends 18B of the pipes 18 which are dispose adjacent to the exterior of the drum 26. The drum 26 further extends upwardly from the bottom of the sump hole 14 to a point just below the level of the floor slab 12. The stones 28 are placed into the sump hole 14 to anchor the drum 26 in place by filling the space around lower portion thereof.

As seen in FIG. 8, the sump pump 20 is placed into and rests upon the bottom of the drum 26 within the sump hole 14. The discharge pipe 22 is generally cylindrical and is connected at one end to and extends upwardly from the top of the sump pump 20 and through the open top of the drum 26. It is connected at an opposite end to the discharge site, which can be the sewer system of the building or some location away from the area below the slab 12, for release of the water at the location where the water will not likely cause any cracking or buckling in or flooding thereabove the slab 12 of the building B.

Also, as seen in FIG. 8, the cover 30 which is placed over the sump hole 14 is generally circular in shape and has a recessed peripheral bottom edge 30A for seating on the upper edge of the slab 12 extending about the sump hole 14. The cover 30 removably covers the sump hole 14 and rests upon the upper surface of the slab 12 so as to provide a relatively level floor surface. The cover 30 further has a small opening 34 therethrough for allowing passage of the discharge pipe 22. The removability of the cover 30 permits easy access to the sump hole 14 for checking on the operation of the sump pump 20 and other parts of the system 10.

The system 10 of the present invention also can be applied to removal of polluting gases, such as radon, by substituting a vacuum-generating means, such as exhaust fan, for the sump pump. As illustrated in FIG. 8, the reference numeral is interchangeably used to indicate either a sump pump or vacuum or exhaust fan 20. The operation of the vacuum or exhaust fan 20 produces a condition of sub-slab depressurization below the floor slab 12 which causes the removal of the polluting gases through the system 10, preventing the gases from entering the building B.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A method of retrofitting an underground water drainage sump system to below a floor slab for protecting the floor slab, said retrofitting method comprising the steps of:

(a) forming a sump hole to extend through a floor slab and into underground below the floor slab;

(b) forming a plurality of lateral passageways in the underground below the floor slab so as to extend outwardly from said sump hole along and below the floor slab to the vicinity of an outer perimeter of the floor slab;

(c) inserting a plurality of perforated hollow collection pipes into the lateral passageways such that outer ends of said collection pipes extend to the vicinity of the outer perimeter of the floor slab and inner ends of said collection pipes are disposed in flow communication with said sump hole; and (d) placing a sump pump into said sump hole for pumping from said sump hole drainage water discharged into said sump hole from said collection pipes.

2. The method of claim 1 wherein said forming said lateral passageways further includes the steps of:

drilling into soil in the underground below the floor slab in directions from said sump hole toward the outer perimeter of the floor slab so as to displace soil from the underground into said sump hole and thereby form said lateral passageways; and removing the soil from the sump hole displaced by said drilling to form said lateral passageways.

3. The method of claim 1 wherein:

said sump hole is formed at a generally central location relative to the outer perimeter of the floor slab; and said lateral passageways are formed to extend radially outwardly from said centrally-located sump hole.

4. The method of claim 1 further comprising the step of:

(e) placing a perforated drum into said sump hole such that said inner ends of said perforated collection pipes are disposed adjacent to said perforated drum.

5. The method of claim 4 further comprising the step of:

(f) placing a quantity of drainage stones in said sump hole around the exterior of at least a lower portion of said perforated drum in said sump hole.

6. The method of claim 1 wherein at least some of said lateral passageways are formed to extend from said sump hole in the underground below the floor slab at a level not lower than a level of a footer extending below and about the outer perimeter of the floor slab and to terminate at points at an interior side of the footer.

7. The method of claim 1 wherein at least some of said lateral passageways are formed to extend from said sump hole in the underground below the floor slab at a level lower than a level of a footer extending below and about the outer perimeter of the floor slab and to terminate at points past an exterior side of the footer.

8. The method of claim 1 wherein said lateral passageways are formed to extend outwardly at two different levels and lengths to and beyond a footer extending below and about the outer perimeter of the floor slab, a first group of said lateral passageways extending at a first level not lower than the level of the footer to points of termination on an interior side of the footer, a second group of said lateral passageways extending at a second level lower than said first level and lower than the level of the footer to points of termination past an exterior side of the footer.

9. The method of claim 8 wherein said forming said lateral passageways further includes:

alternating said lateral passageways between said two different levels and lengths.

10. The method of claim 1 further comprising the step of:

(e) providing a cover for removably covering an upper end of said sump hole.

11. A method of retrofitting an underground water drainage sump system to below a floor slab for protecting the floor slab, said retrofitting method comprising the steps of:

(a) forming a sump hole to extend through a floor slab and into underground below the floor slab;

(b) forming a plurality of lateral passageways in the underground below the floor slab so as to extend outwardly from said sump hole along and below the floor slab at a level not lower than a level of a footer extending below and about an outer perimeter of the floor slab and to terminate at points at an interior side of the footer;

(c) inserting a plurality of perforated hollow collection pipes into the lateral passageways such that outer ends of said collection pipes extend to the interior side of the footer and inner ends of said collection pipes are disposed in flow communication with said sump hole;

(d) placing a perforated drum into said sump hole such that said inner ends of said perforated collection pipes are disposed adjacent to said perforated drum; and (e) placing a sump pump into said sump hole for pumping from said sump hole drainage water discharged into said sump hole from said collection pipes.

12. The method of claim 11 wherein said forming said lateral passageways further includes the steps of:

drilling into soil in the underground below the floor slab in directions from said sump hole toward the outer perimeter of the floor slab so as to displace soil from the underground into said sump hole and thereby form said lateral passageways; and removing the soil from the sump hole displaced by said drilling to form said lateral passageways.

13. The method of claim 11 wherein:

said sump hole is formed at a generally central location relative to the outer perimeter of the floor slab; and said lateral passageways are formed to extend radially outwardly from said centrally-located sump hole.

14. The method of claim 11 further comprising the step of:

(f) placing a quantity of drainage stones in said sump hole around the exterior of at least a lower portion of said perforated drum in said sump hole.

15. The method of claim 11 further comprising the step of:

(f) providing a cover for removably covering an upper end of said sump hole.

16. A method of retrofitting an underground water drainage sump system to below a floor slab for protecting the floor slab, said retrofitting method comprising the steps of:

(a) forming a sump hole to extend through a floor slab and into underground below the floor slab;

(b) forming a plurality of lateral passageways in the underground below the floor slab so as to extend outwardly from said sump hole along and below the floor slab at a level lower than a level of a footer extending below and about an outer perimeter of the floor slab and to terminate at points past an exterior side of the footer;

(c) inserting a plurality of perforated hollow collection pipes into the lateral passageways such that outer ends of said collection pipes extend past the exterior side of the footer and inner ends of said collection pipes are disposed in flow communication with said sump hole;

(d) placing a perforated drum into said sump hole such that said inner ends of said perforated collection pipes are disposed adjacent to said perforated drum; and (e) placing a sump pump into said sump hole for pumping from said sump hole drainage water discharged into said sump hole from said collection pipes.

17. The method of claim 16 wherein said forming said lateral passageways further includes the steps of:

drilling into soil in the underground below the floor slab in directions from said sump hole toward the outer perimeter of the floor slab so as to displace soil from the underground into said sump hole and thereby form said lateral passageways; and removing the soil from the sump hole displaced by said drilling to form said lateral passageways.

18. The method of claim 16 wherein:

said sump hole is formed at a generally central location relative to the outer perimeter of the floor slab; and said lateral passageways are formed to extend radially outwardly from said centrally-located sump hole.

19. The method of claim 16 further comprising the step of:

(f) placing a quantity of drainage stones in said sump hole around the exterior of at least a lower portion of said perforated drum in said sump hole.

20. The method of claim 16 further comprising the step of:

(f) providing a cover for removably covering an upper end of said sump hole.

21. A method of retrofitting an underground water drainage sump system to below a floor slab for protecting the floor slab, said retrofitting method comprising the steps of:

(a) forming a sump hole to extend through a floor slab and into underground below the floor slab;

(b) forming a plurality of lateral passageways in the underground below the floor slab so as to extend outwardly from said sump hole along and below the floor slab at two different levels and lengths to and beyond a footer extending below and about an outer perimeter of the floor slab, a first group of said lateral passageways extending at a first level not lower than the level of the footer to points of termination on an interior side of the footer, a second group of said lateral passageways extending at a second level lower said first level and lower than the level of the footer to points of termination past an exterior side of the footer;

(c) inserting a plurality of perforated hollow collection pipes into the lateral passageways such that outer ends of said collection pipes extend to the interior side of the footer and inner ends of said collection pipes are disposed in flow communication with said sump hole;

(d) placing a perforated drum into said sump hole such that said inner ends of said perforated collection pipes are disposed adjacent to said perforated drum; and (e) placing a sump pump into said sump hole for pumping from said sump hole drainage water discharged into said sump hole from said collection pipes.

22. The method of claim 21 wherein said forming said lateral passageways further includes the steps of:

drilling into soil in the underground below the floor slab in directions from said sump hole toward the outer perimeter of the floor slab so as to displace soil from the underground into said sump hole and thereby form said lateral passageways; and removing the soil from the sump hole displaced by said drilling to form said lateral passageways.

23. The method of claim 21 wherein:

said sump hole is formed at a generally central location relative to the outer perimeter of the floor slab; and said lateral passageways are formed to extend radially outwardly from said centrally-located sump hole.

24. The method of claim 21 further comprising the step of:

(f) placing a quantity of drainage stones in said sump hole around the exterior of at least a lower portion of said perforated drum in said sump hole.

25. The method of claim 21 further comprising the step of:

(f) providing a cover for removably covering an upper end of said sump hole.

26. In combination with a floor slab having an outer perimeter, an underground water drainage sump system for protecting the floor slab, said system comprising:

(a) a sump hole formed through the floor slab and extending into underground below the floor slab, said sump hole being formed at a generally central location relative to the outer perimeter of the floor slab;

(b) a plurality of lateral passageways formed in the underground below the floor slab so as to extend radially outwardly from said centrally-located sump hole along and below the floor slab to the vicinity of the outer perimeter of the floor slab;

(c) a plurality of perforated hollow collection pipes disposed in said lateral passageways such that outer ends of said collection pipes extend to the vicinity of the outer perimeter of the floor slab and inner ends of said collection pipes are disposed in flow communication with said sump hole;

(d) a perforated drum disposed in said sump hole such that said inner ends of said perforated collection pipes are disposed adjacent to said perforated drum; and (e) a sump pump disposed in said perforated drum and being operable for pumping from said sump hole drainage water discharged into said sump hole from said collection pipes.

27. The system of claim 26 further comprising:

(f) a quantity of drainage stones disposed in said sump hole around the exterior of at least a lower portion of said perforated drum in said sump hole.

28. The system of claim 26 wherein at least some of said lateral passageways are formed to extend from said sump hole in the underground below the floor slab at a level not lower than a level of a footer extending below and about the outer perimeter of the floor slab and to terminate at points at an interior side of the footer.

29. The system of claim 26 further comprising:

(f) a cover disposed over an upper end of said sump hole for removably covering the upper end of said sump hole.

30. In combination with a floor slab having an outer perimeter, an underground water drainage sump system for protecting the floor slab, said system comprising:

(a) a sump hole formed through the floor slab and extending into underground below the floor slab;

(b) a plurality of lateral passageways formed in the underground below the floor slab so as to extend outwardly from said sump hole along and below the floor slab to the vicinity of the outer perimeter of the floor slab, at least some of said lateral passageways being formed to extend from said sump hole in the underground below the floor slab at a level lower than a level of a footer extending below and about the outer perimeter of the floor slab and to terminate at points past an exterior side of the footer;

(c) a plurality of perforated hollow collection pipes disposed in said lateral passageways such that outer ends of said collection pipes extend to the vicinity of the outer perimeter of the floor slab and inner ends of said collection pipes are disposed in flow communication with said sump hole;

(d) a perforated drum disposed in said sump hole such that said inner ends of said perforated collection pipes are disposed adjacent to said perforated drum; and (e) a sump pump disposed in said perforated drum and being operable for pumping from said sump hole drainage water discharged into said sump hole from said collection pipes.

31. In combination with a floor slab having an outer perimeter, an underground water drainage sump system for protecting the floor slab, said system comprising:

(a) a sump hole formed through the floor slab and extending into underground below the floor slab;

(b) a plurality of lateral passageways formed in the underground below the floor slab so as to extend outwardly from said sump hole along and below the floor slab to the vicinity of the outer perimeter of the floor slab, said lateral passageways being formed to extend outwardly at two different levels and lengths to and beyond a footer extending below and about the outer perimeter of the floor slab, a first group of said lateral passageways extending at a first level not lower than the level of the footer to points of termination on an interior side of the footer, a second group of said lateral passageways extending at a second level lower than said first level and lower than the level of the footer to points of termination past an exterior side of the footer;

(c) a plurality of perforated hollow collection pipes disposed in said lateral passageways such that outer ends of said collection pipes extend to the vicinity of the outer perimeter of the floor slab and inner ends of said collection pipes are disposed in flow communication with said sump hole;

(d) a perforated drum disposed in said sump hole such that said inner ends of said perforated collection pipes are disposed adjacent to said perforated drum; and (e) a sump pump disposed in said perforated drum and being operable for pumping from said sump hole drainage water discharged into said sump hole from said collection pipes.

32. The system of claim 31 wherein said lateral passageways alternate between said two different levels and lengths.

33. In combination with a floor slab having an outer perimeter, a sub-slab underground depressurization system for removal of polluting gases, said system comprising:

(a) a sump hole formed through the floor slab and extending into underground below the floor slab;

(b) a plurality of lateral passageways formed in the underground below the floor slab so as to extend outwardly from said sump hole along and below the floor slab to the vicinity of the outer perimeter of the floor slab;

(c) a plurality of perforated hollow collection pipes disposed in said lateral passageways such that outer ends of said collection pipes extend to the vicinity of the outer perimeter of the floor slab and inner ends of said collection pipes are disposed in flow communication with said sump hole;

(d) a perforated drum disposed in said sump hole such that said inner ends of said perforated collection pipes are disposed adjacent to said perforated drum; and (e) a vacuum-generating means disposed in said perforated drum for drawing gases into said sump hole from said porous collection pipes and for exhausting said gases from said sump hole and thereby enabling sub-slab depressurization for removal of polluting gases.

34. The system of claim 33 wherein:

said sump hole is formed at a generally central location relative to the outer perimeter of the floor slab; and said lateral passageways are formed to extend radially outwardly from said centrally-located sump hole.

35. The system of claim 33 further comprising:

(f) a quantity of drainage stones disposed in said sump hole around the exterior of at least a lower portion of said perforated drum in said sump hole.

36. The system of claim 33 wherein a first group of said lateral passageways are formed to extend from said sump hole in the underground below the floor slab at a level not lower than a first level of a footer extending below and about the outer perimeter of the floor slab and to terminate at points at an interior side of the footer.

37. The system of claim 36 wherein a second group of said lateral passageways are formed to extend from said sump hole in the underground below the floor slab at a second level lower than said first level and lower than a level of a footer extending below and about the outer perimeter of the floor slab and to terminate at points past an exterior side of the footer.

38. The system of claim 37 wherein said lateral passageways alternate between said first and second levels.

39. The system of claim 33 further comprising:

(f) a cover disposed over an upper end of said sump hole for removably covering and sealing said sump hole at said upper end thereof.

40. The system of claim 33 wherein said vacuum-creating means is an exhaust fan.

* * * * *